April 2, 1968          G. KIPER          3,375,769

COMBINED SHUTTER AND DIAPHRAGM FOR PHOTOGRAPHIC CAMERAS

Filed July 7, 1965          2 Sheets-Sheet 1

INVENTOR.
GERD KIPER
BY
Michael J. Striker
Atty

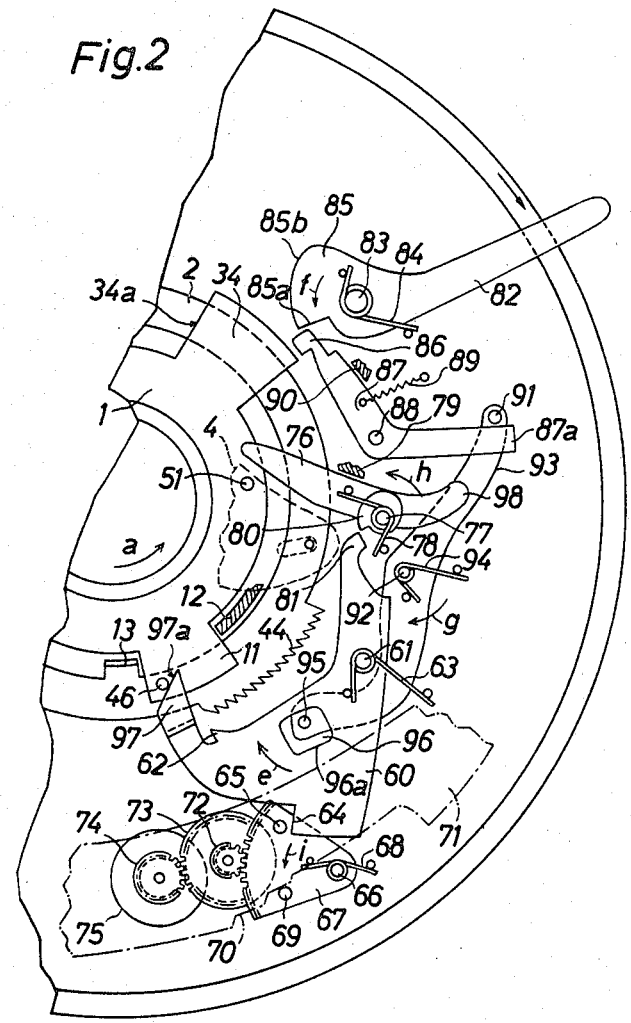

United States Patent Office 3,375,769
Patented Apr. 2, 1968

3,375,769
COMBINED SHUTTER AND DIAPHRAGM FOR
PHOTOGRAPHIC CAMERAS
Gerd Kiper, Unterhaching, near Munich, Germany,
assignor to Agfa-Gevaert AG, Munich, Germany
Filed July 7, 1965, Ser. No. 470,172
Claims priority, application Germany, July 16, 1964,
A 46,600
15 Claims. (Cl. 95—63)

ABSTRACT OF THE DISCLOSURE

A photographic camera wherein the shutter acts as a diaphragm and comprises a leading ring, a trailing ring and blades connected with both rings. The size of the aperture defined by the blades and the exposure time change as a function of the extent to which the leading ring moves from cocked position ahead of the trailing ring and of the delay with which the trailing ring follows the leading ring to uncocked position. The leading ring is coupled with a retard mechanism which controls the speed of its movement to uncocked position and the trailing ring is controlled by a delay mechanism which determines the exact moment of its release as a function of the intensity of scene light or which can be set by hand to determine in advance the delay with which the trailing ring is released for movement to uncocked position to thereby close the aperture.

---

Figure 1:
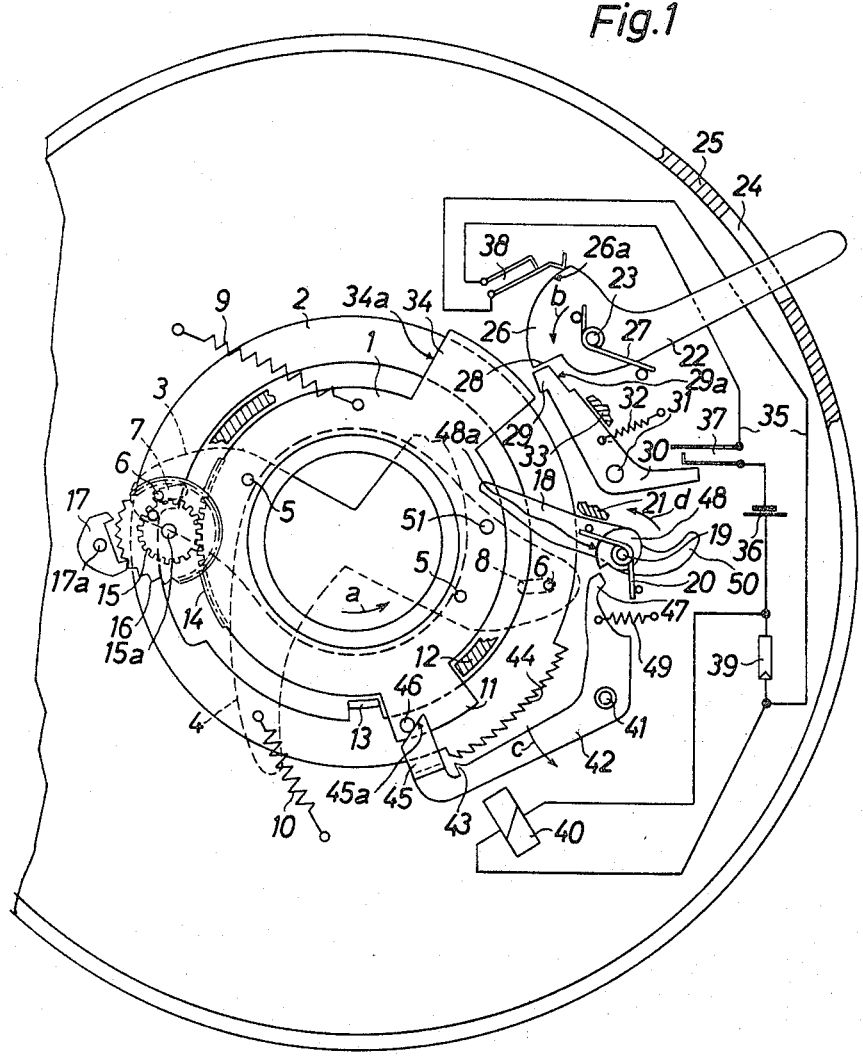

The present invention relates to photographic cameras in general, and more particularly to improvements in photographic cameras of the type wherein a set of relatively movable blades may define a diaphragm opening of variable size and wherein this same set of blades also constitutes the shutter mechanism. Still more particularly, the invention relates to improvements in a combined diaphragm and shutter mechanism of the type wherein two rings or analogous setting members are movable between cocked and uncocked positions and wherein not only the size of the diaphragm opening but also the exact exposure time depends on movements of one of the setting members with reference to the other setting member.

It is an important object of the present invention to provide a combined diaphargm and shutter mechanism which is constructed and assembled in such a way that, merely by controlling the duration of the delay between movements of the two setting members to uncocked positions, the mechanism will automatically select not only the size of the diaphragm opening but also the exposure time.

Another object of the invention is to provide a mechanism of the just outlined characteristics wherein the leading setting member automatically releases the trailing setting member during its movement to uncocked position.

A further object of the present invention is to provide a combined diaphragm and shuttter mechanism wherein the exact size of the diaphragm opening and the exposure time may be selected as a function of the intensity of light coming from a viewed scene or subject.

An additional object of the invention is to provide a mechanism of the just outlined characteristics wherein, in addition to the possibility of automatically determining the two exposure values, each value may be selected beforehand so that a camera embodying the improved mechanism may select the size of the diaphragm opening and the exposure time either automatically or at the will of the user.

Still another object of the invention is to provide a novel delay structure which controls the duration of the delay between the movements of the two setting members to their respective uncocked positions.

A concomitant object of the invention is to provide a combined diaphragm and shutter mechanism wherein the speed of one setting member during its movement from cocked to uncocked position may be controlled with utmost accuracy and all the way between such positions.

Still another object of the instant invention is to provide a mechanism of the above outlined type wherein cocking of one of the setting members suffices to effect cocking of the other setting member.

A further object of the invention is to provide a novel electrical delay circuit for use in a mechanism of the above outlined characteristics.

Another object of the invention is to provide a novel mechanical delay structure which may be used as a substitute for the just mentioned electrical circuit or vice versa.

Briefly stated, one feature of my present invention resides in the provision of a combined shutter and diaphragm mechanism for photographic cameras which comprises a pair of setting members each movable between a single cocked position and a single uncocked position and each tending to assume the respective uncocked position, blade means coupled with the setting members and arranged to define a diaphragm opening of desired size when one of the setting members moves to uncocked position ahead of the other setting member, retard means for controlling the speed of the one setting member during the entire movement to uncocked position, cocking means for moving the two setting members to cocked positions, and delay means for delaying the movement of the other setting member to uncocked position following the movement of the one setting member to uncocked position so that the duration of such delay determines not only the exact size of the diaphragm opening but also the exact exposure time.

The retard means may comprise an escapement wheel or a rotary mass which acts not unlike a flywheel. The delay means may include an electrical delay circuit or it may comprise a mechanical or pneumatic delay unit.

In accordance with another important feature of my invention, the one setting member may be provided with means for disengaging the delay means from the other setting member to thereby effect closing of the diaphragm opening by allowing the second setting member to return to its uncocked position.

The novel features which are considered a characteristic of the invention are set forth in particular in the appended claims. The improved photographic camera itself, however, both as to its construction and the mode of manipulating the same, together with additional features and advantages thereof, will be best understood upon perusual of the following detailed description of certain specific embodiments with reference to the accompanying drawings, in which:

FIG. 1 is a fragmentary diagrammatic front elevational view of a still camera which is constructed and assembled in accordance with a first embodiment of my invention, the setting members of the combined shutter and diaphragm mechanism being shown in their uncocked positions; and FIG. 2 is a similar fragmentary diagrammatic front elevational view of a still camera which embodies a modified mechanism.

Referring to the drawings, and first to FIG. 1, there is shown a portion of a still camera which includes a combined shutter and diaphragm mechanism including two relatively movable setting members here shown as two concentric rings 1 and 2 rotatable about the optical axis.

These rings control the position of two blades 3 and 4 which can define a diaphragm opening of required size, depending on the intensity of light coming from a viewed scene or subject. The ring 1 carries two angularly spaced pins 5 each of which pivotally supports one of the blades 3 and 4. The ring 2 carries pins 6 which extend into elongated slots 8, 9 respectively provided in the blades 3 and 4. Thus, when the rings 1 and 2 turn in the same direction and at the same rate of speed, the position of the blades 3 and 4 with reference to each other remains unchanged. However, when one of the rings 1 and 2 turns with reference to the other ring, or when both rings turn but at different speeds or in different directions, the position of the blades 3 and 4 with reference to each other will change. It is clear that the mechanism of FIG. 1 may comprise more than two blades.

The rings 1 and 2 are respectively biased by two helical return springs 9 and 10. The spring 9 is anchored in the housing 25 of the combined shutter and diaphragm mechanism and tends to turn the ring 1 in a counterclockwise direction as indicated by an arrow a. The spring 10 is also anchored in the housing 25 and tends to turn the ring 2 in the same (counterclockwise) direction. The ring 1 carries a radially outwardly extending projection or lug 11 which comes into abutment with a fixed stop 12 when the ring 1 assumes its uncocked position, i.e., the projection 11 is free to abut against the stop 12 when the ring 1 is allowed to follow the bias of the return spring 9. The projection 11 may engage with a projection or lug 13 of the ring 2 to turn the latter in a clockwise direction (i.e., against the bias of the return spring 10) when the mechanism is cocked and the ring 1 turns in a clockwise direction. In other words, cocking of the mechanism will take place by turning the ring 1 in a clockwise direction whereby the projection 11 engages the projection 13 and causes the ring 2 to turn in the same clockwise direction.

The periphery of the ring 1 is provided with an arcuate toothed portion 14 which forms part of a retard unit and meshes with a pinion 15 which is rotatable about a fixed shaft 15a. The pinion 15 is rigid with an escapement wheel 16 which cooperates with the pallets of a twin pawl 17 mounted on a separate shaft 17a. The construction of the retard unit including the parts 14-17a is preferably such that the movement of the ring 1 under the bias of the return spring 9 (arrow a) is retarded uniformly all the way toward and into actual abutment with the stop 12, i.e., that the speed of the ring 1 is constant all the way from the cocked to uncocked position.

The rings 1 and 2 may be cocked by a cocking lever 18 which is rigid with a shaft 19, and this shaft may be turned in a sense to cock the rings by means of a suitable film transporting lever or wheel, not shown. Thus, it can be said that the elements 18 and 19 together constitute a means for cocking the rings 1 and 2 by moving such rings in a clockwise direction whereby the projection 11 of the ring 1 moves away from the stop 12 and entrains the projection 13 of the ring 2. The longer arm of the cocking lever 18 then engages a motion transmitting pin 51 on the ring 1 and causes the latter to turn in a clockwise direction. The lever 18 is biased by a torsion spring 20 which is convoluted around the shaft 19 and tends to turn this lever in a clockwise direction, i.e., counter to that indicated by an arrow d. When the cocking lever 18 is released, it follows the bias of the spring 20 and moves its longer arm into abutment with a fixed stop 21. In such position of the lever 18, its longer arm is preferably somewhat spaced from the pin 51 so as to permit return movement of the projection 11 into abutment with the fixed stop 12.

The trigger means for releasing the combined shutter and diaphragm mechanism comprises two levers 22 and 30. The lever 22 is rotatable on a fixed shaft 23 and its longer arm extends through a suitable cutout or slot 24 provided in the housing 25 so as to be readily engaged by hand. The shorter arm 26 of the lever 22 constitutes a cam, and this lever is biased by a torsion spring 27 which tends to rock it in a counterclockwise direction (arrow b).

In FIG. 1, the rings 1 and 2 are shown in uncocked positions in which the projection 11 of the ring 1 abuts against the fixed stop 12 and the longer arm of the cocking lever 18 is spaced from the motion transmitting pin 51. The cam 26 has a flat radially extending face 28 which then abuts against a locking nose 29 of the lever 30, the latter being rockable about a fixed shaft 31 and being biased by a helical spring 32 which tends to maintain it in abutment with a fixed stop 33. When the rings 1 and 2 are being cocked, i.e., when the ring 11 is turned in a clockwise direction to move its projection 11 away from the stop 12, the locking nose 29 of the lever 30 may engage the radial face 34a of a projection or arm 34 on the ring 1 and thus holds this ring against return movement in the direction indicated by the arrow a. The arcuate face 26a of the cam 26 is then located directly behind the face 29a of the locking nose 29 and prevents return movement of the lever 30 into abutment with the fixed stop 33, i.e., the locking nose 29 is then compelled to remain in engagement with the radial face 34a of the arm 34. It will be seen that each of the rings 1 and 2 is movable between a single cocked position (when the locking nose 29 engages the arm 34) and a single uncocked position (when the projection 11 abuts against the stop 12).

In the camera of FIG. 1, the means for automatically determining the size of the diaphragm opening and for automatically determining the exposure time comprises an electrical delay circuit 35. The circuit 35 includes a source 36 of electrical energy (e.g., a battery or a miniature accumulator), a control switch 37 which is normally open and is connected in series with the source 36, a normally closed main switch 38 which is connected in series with the control switch 37, a photoelectric resistor 39 which is connnected in series with the source 36, and a relay 40 which is normally deenergized and is connected in parallel with the resistor 39. The latter is preferably installed in or on the front wall of the camera so as to be in the path of light coming from a viewed scene or subject. The source 36 is preferably accommodated in the interior of the camera. The remaining components of the circuit 35 can be installed in the housing 25. Each of the switches 37, 38 comprises a fixed contact and a movable contact, and each movable contact normally tends to move away from the respective fixed contact, i.e., each of these switches tends to assume an open position. The control switch 37 may be closed by the second lever 30, and the main switch 38 may be closed by the cam 26 on the first lever 22 of the release trigger means.

The armature of the relay 40 takes the form of a rockable blocking or delaying lever 42 which is turnable about a fixed shaft 41. The lower arm of the blocking lever 41 carries a tooth 43 which may engage with any one of a series of teeth forming a toothed portion 44 on the periphery of the ring 2. The lower arm of the blocking lever 42 also carries a bent-over terminal portion or tip 45 having an inclined cam face 45a which may be engaged by a rocking pin 46 provided on the projection 11 of the ring 1. The pin 46 may rock the blocking lever 42 to such an extent (in the direction indicated by an arrow c) that the tooth 43 moves out of mesh with the toothed portion 44 of the ring 2. The upper arm of the blocking lever 42 carries an arresting portion 47 which can be engaged by an arresting cam 48 on the shaft 19 of the cocking lever 18. The blocking lever 42 is biased by a helical spring 49 which tends to rock it in a clockwise direction, as viewed in FIG. 1, so as to move the tooth 43 into mesh with the toothed portion 44 of the ring 2.

The shorter arm 50 of the cocking lever 18 constitutes a means for moving the second lever 30 of the release trigger means into retaining position in which the locking nose 29 engages the radial face 34a of the arm 34. Such movement of the lever 30 will take place against the bias of the spring 32 and at a time when the ring 1 has been turned sufficiently to move the arm 34 in a clockwise direction so that the locking nose 29 can move into engagement with the face 34a.

Prior to making an exposure, the parts of the camera are held in the positions shown in FIG. 1. The user then actuates the film transporting lever or wheel (not shown) to turn the shaft 19 in a counterclockwise direction (arrow d) whereby the longer arm of the cocking lever 18 entrains the pin 51 and causes the ring 1 to turn in a clockwise direction so that the projection 11 moves away from the fixed stop 12 and entrains the projection 13 of the ring 2. The springs 9 and 10 undergo expansion and store energy. Prior to completion of the cocking step, the shorter arm 50 of the cocking lever 18 engages the right-hand arm of the lever 30 and causes the locking nose 29 to engage the radial face 34a of the arm 34 on the ring 1 whereby the latter is temporarily locked or retained in cocked position. Such angular movement of the lever 30 against the bias of the spring 32 (and in response to the action of the cocking lever 18) suffices to move the locking nose 29 inwardly and away from the flat radial face 28 on the cam 26 so that the lever 22 can be rocked by its spring 27 and rocks in a counterclockwise direction (arrow b). The arcuate face 26a of the cam 26 is then located directly behind the locking nose 29 and cooperates with the face 29a to retain the nose 29 in engagement with the face 34a on the arm 34 of the ring 1. At the same time, the cam face 26a moves away from the movable contact of the main switch 38 so that the switch 38 opens. However, the control switch 37 is then closed because its movable contact is engaged by the shorter arm of the lever 30, this lever having been rocked by the shorter arm 50 of the cocking lever 18. The arcuate face 48a of the cam 48 on the cocking lever 18 is located behind the arresting portion 47 of the blocking lever 42 so that this lever cannot rock in a clockwise direction (counter to that indicated by the arrow c). This means that the tooth 43 of the blocking lever 42 cannot engage the toothed portion 44 of the ring 2.

As soon as the film transporting lever or wheel is released, the shaft 19 and the cocking lever 18 can rotate in response to the bias of the spring 20 and the longer arm of the lever 18 returns into abutment with the fixed stop 21. During cocking, the rings 1 and 2 cannot move with reference to each other so that the blades 3 and 4 overlap and prevent the light rays from reaching the film.

The exposure is made when the user thereupon rocks the lever 22 in a direction counter to that indicated by the arrow b. The cam face 26a then closes the main switch 38 so that the circuit 35 is completed and the relay 40 is energized. The thus energized relay 40 attracts the lower arm of the blocking lever 42 so that the latter rocks in the direction indicated by the arrow c and moves the tooth 43 away from engagement with the teeth 44 on the ring 2. The tooth 43 was allowed to engage the teeth 44 at the time the film transporting lever or wheel was released, i.e., at the time the cocking lever 18 was allowed to return into abutment with the stop 21.

The locking nose 29 of the lever 30 is disengaged from the radial face 34a of the arm 34 on ring 1 as soon as the lever 22 is rocked sufficiently to move the cam face 26a away from the face 29a of the lever 30. Such movement of the locking nose 29 away from the arm 34 takes place under the bias of the spring 32 which tends to rock the lever 30 in a clockwise direction and into abutment with the fixed stop 33. The ring 1 then follows the bias of the spring 9 and turns in a counterclockwise direction (arrow a) and at a constant speed determined by the retard unit 14–17a. The ring 2 shares such movement of the ring 1 because the tooth 43 of the blocking lever 42 is disengaged from the toothed portion 44. Thus, the angular position of the blades 3 and 4 with reference to each other remains unchanged.

However, as the lever 30 is allowed to follow the bias of the spring 32, its shorter arm releases the movable contact of the control switch 37 so that the switch 37 opens. The resulting opening of the circuit 35 takes place during the initial stage of return movement of the ring 1 to uncocked position. The relay 40 is not deenergized immediately because a current still continues to flow in the delay circuit proper including the relay 40 and resistor 39. If the resistance of the resistor 39 is low, i.e., if the intensity of light coming from the viewed scene or subject is low, the relay 40 is deenergized shortly after the control switch 37 opens. If the resistance of the resistor 39 is relatively high, namely, if the intensity of incoming light is high, the relay 40 will be deenergized with a longer delay. In other words, the exact time when the relay 40 is deenergized is a function of the intensity of incoming light because such intensity will determine the resistance of the resistor 39.

When the relay 40 is deenergized, the blocking lever 42 is rocked by the spring 49 and rotates in a clockwise direction so that the tooth 43 engages a certain tooth of the toothed portion 44 on the ring 2 and prevents further turning of this ring under the bias of the spring 10. Thus, the ring 1 continues to turn but the ring 2 is arrested. Consequently, the angular position of the blades 3 and 4 with reference to each other changes and these blades define a diaphragm opening whose size is a function of the intensity of incoming light. Not only the size of the diaphragm opening but also the exposure time will depend on the intensity of light because such intensity determines which of the teeth on the portion 44 of the ring 2 is engaged by the tooth 43 of the blocking lever 42. When the ring 1 completes or almost completes its movement to uncocked position, its pin 46 engages the inclined face 45a of the terminal portion 45 on the blocking lever 42 and rocks the lever 42 in the direction indicated by the arrow c so that the tooth 43 is disengaged from the toothed portion 44 and the ring 2 immediately returns to uncocked position to close the diaphragm opening. The projection 13 then abuts against the projection 11 and the latter abuts against the fixed stop 12. The exposure is completed and the camera is ready for the next operation which requires rocking the cocking lever 18 in a counterclockwise direction and subsequent rocking of the lever 22 in a clockwise direction.

The camera of FIG. 2 differentiates from the just described camera of FIG. 1 in that the automatic delay circuit 35 is replaced by a manually or automatically adjustable mechanical delay unit. This delay unit includes a blocking lever 60 which is rockable about a fixed shaft 61 and is biased by a torsion spring 63 so that it tends to rotate in a clockwise direction as indicated by an arrow e. The blocking lever 60 comprises a tooth 62 which may engage a selected tooth on the toothed portion 44 of the setting ring 2. Furthermore, the blocking lever 60 is provided with a motion transmitting face 64 which can engage a stud 65 provided on a toothed segment 67 which is rotatable on a fixed shaft 66 and is biased by a torsion spring 68 so that it tends to rotate in a clockwise direction, as viewed in FIG. 2. The spring 66 maintains a follower 69 of the toothed segment 67 in engagement with the face of a cam 70 forming part of a ring-shaped selector 71. The selector 71 may be adjusted by hand and preferably comprises an index which can be moved into registry with the graduations of a scale (not shown) whereon the graduation sindicate various exposure values. Alternatively, the selector 71 may be adjusted by an automatic exposure control of well known construction which normally comprises a galvanometer having a pointer whose angular position is a function of the intensity of incoming light. The galvanometer is connected in circuit with a photoelectric cell or with a photoelectric resistor, and the resistance which the resistor offers to the passage of electric current is a function of light intensity.

The segment 67 is coupled with a rotary cylindrical or wheel-shaped mass 75 through a gear train which includes gears 72, 73 and 74. The parts 65–75 constitute a mechanical delay device for the ring 2. This delay device may be replaced by a pneumatic delay device or by another type of mechanical delay device.

The rings 1 and 2 of the camera shown in FIG. 2 may be cocked by a cocking lever 76 which is rockable with a cocking shaft 77 and is biased by a torsion spring 78 so that its longer arm tends to remain in abutment with a fixed stop 79. The longer arm of the cocking lever 76 may entrain a pin 51 on the setting ring 1 to move the latter from uncocked to cocked position in the same way as described in connection with FIG. 1. The shaft 77 may be rotated by the lever or wheel of a film transporting device, not shown. The arresting cam 80 which is rigid with the cocking lever 76 is analogous to the arresting cam 48 of FIG. 1. This cam 80 can cooperate with an arresting portion 81 of the blocking lever 60.

The trigger means for releasing the combined diaphragm and shutter mechanism of FIG. 2 comprises two levers 82 and 87. The lever 82 is rockable about a fixed shaft 83 and is biased by a torsion spring 84 which tends to rotate this lever in a counterclockwise direction as indicated by an arrow f. In FIG. 2, the rings 1 and 2 are shown in their uncocked positions and, therefore, the flat radial face 85a of the cam 85 on the lever 82 abuts against a locking nose 86 on the second lever 87. The nose 86 corresponds to the locking nose 29 of FIG. 1 and may engage the radially extending face 34a on the arm 34 of the setting ring 1. The lever 87 is mounted on a fixed shaft 88 and is biased by a helical spring 89 which tends to maintain its left-hand arm (which carries the locking nose 86) in abutment with a fixed stop 90. The means for rocking the lever 87 against the bias of the spring 89 and in a sense to move the locking nose 86 into engagement with the radial face 34a of the arm 34 comprises a short arm 98 which forms part of the cocking lever 76.

The mechanism of FIG. 2 further comprises a connecting lever 93 which is rockable on a fixed shaft 92 and is biased by a torsion spring 94 tending to rotate it in a clockwise direction as indicated by an arrow g. The terminal portion of the upper arm of the connecting lever 93 carries a stud 91 which may be engaged by the right-hand arm 87a of the lever 87. A second stud 95 is provided on the lower arm of the connecting lever 93 and extends into a cutout or slot 96 provided in the blocking lever 60. The blocking lever 60 further comprises a bent-over terminal portion or tip 97 having an inclined face 97a corresponding to the inclined face 45a shown in FIG. 1 and engageable by the rocking pin 46 on the projection 11 of the setting ring 1. The purpose of the rocking pin 46 is to disengage the tooth 62 of the blocking lever 60 from the toothed portion 44 of the ring 2 and to allow return movement of the ring 2 to its uncocked position.

To cock the rings 1 and 2, the user rotates the shaft 77 and the cocking level 76 in the direction indicated by an arrow h. The cocking lever 76 entrains the pin 51 and turns the setting ring 1 in a clockwise direction whereby the projection 11 of the ring 1 moves away from the fixed stop 12 and entrains the projection 13 to turn the ring 2 in the same direction, i.e., counter to that indicated by the arrow a. The arresting cam 80 engages the portion 81 of the blocking lever 60 and prevents the tooth 62 from engaging the toothed portion 44 of the ring 2. Shortly prior to completion of the cocking step, the shorter arm 98 of the cocking level 76 engages the arm 87a and causes the locking nose 86 to engage the radial face 34a of the arm 34 to thus lock the ring 1 in cocked position. The lever 82 is then free to follow the bias of the spring 84 (arrow f) and moves the arcuate face 85b of its cam 85 behind the locking nose 86 to prevent unlocking of the ring 1. During rocking of the lever 87, its arm 87a engages the stud 91 and rocks the connecting lever 93 in a counterclockwise direction, as viewed in FIG. 2. This moves the stud 95 into abutment with the surface 96a bounding the cutout 96 and the connecting lever 93 then holds the blocking lever 60 in the illustrated position, i.e., the tooth 62 remains disengaged from the toothed portion 44 of the ring 2.

In order to make an exposure, the user then turns the selector ring 71 to a desired angular position whereby the cam 70 engages the follower 69 and rotates the toothed segment 67 so that the stud 65 comes to rest at a predetermined distance from the motion transmitting face 64 of the blocking lever 60. In the final step, the user rocks the lever 82 in a clockwise direction, as viewed in FIG. 2, i.e., counter to that indicated by the arrow f, so that the face 85b of the cam 85 moves away from the locking nose 86 and the lever 87 is immediately rocked by its spring 89 to return into abutment with the fixed stop 90. The locking nose 86 is disengaged from the face 34a of the arm 34 and the ring 1 begins to turn back to its uncocked position by rotating in the direction indicated by an arrow a. The spring 9 for the ring 1 is not shown in FIG. 2. The speed of this ring during its movement back to uncocked position is determined by the retard unit 14–17a, not shown in FIG. 2.

At the exact moment when the lever 87 is disengaged from the arm 34 of the ring 1, the arm 87a of this lever turns in a clockwise direction and allows the connecting lever 93 to follow the bias of its spring 94 which causes it to rock in a clockwise direction as indicated by the arrow g. The stud 95 moves away from the surface 96a in the cutout 96, and the spring 63 causes the blocking lever 60 to rock in a clockwise direction (arrow e) whereby the face 64 comes into actual abutment with the stud 65 of the toothed segment 67. Thus, the segment 67 begins to turn in the direction indicated by the arrow i and rotates the mass 75 through the intermediary of the gear train 72—72. The time necessary for moving the stud 65 out of the path of the blocking lever 60 depends on the initial setting of the segment 67, i.e., on the extent to which the follower 69 was turned by the cam 70 of the selector 71.

As soon as the face 64 moves the stud 65 out of its way, i.e., in response to a predetermined angular movement of the segment 67 in the direction indicated by the arrow i, the blocking lever 60 is free to rock rapidly in the direction indicated by the arrow e and moves its tooth 62 into engagement with the toothed portion 44 of the ring 2. The ring 2 is arrested but the ring 1 continues to turn in the direction indicated by the arrow a whereby the blades (only the blade 4 is shown in FIG. 2) define a diaphragm opening of optimum size for the particular exposure. The size of the diaphragm opening depends on the setting of the selector 71, i.e., on the angular position of the cam 70. Immediately prior to the time when the size of the diaphragm opening reaches the selected value, the rocking pin 46 on the projection 11 of the ring 1 engages the inclined face 97a of the tip 97 and rocks the blocking lever 60 in a counterclockwise direction so that the tooth 62 is disengaged from the toothed portion 44 and the ring 2 immediately returns to uncocked position to close the diaphragm opening. Since the exact time when the tooth 62 is disengaged from the toothed portion 44 of the ring 2 also depends on the setting of the selector 71, this selector will determine not only the size of the diaphragm opening but also the exposure time. In other words, the selector 71 can determine the exact moment when the rocking pin 46 of the ring 1 will disengage the toothed portion 44 from the tooth 62 of the blocking lever 60 and hence the exposure time.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the following claims.

What is claimed as new and desired to be protected by Letters Patent is:

1. In a photographic camera, a combined diaphragm and shutter mechanism comprising a pair of setting members each movable between a single cocked position and a single uncocked position and each tending to assume the respective uncocked position; blade means mounted turnably about pivot axis means parallel to the optical axis of said camera and coupled with said setting members and arranged to define a diaphragm opening when one of said setting members moves to uncocked position ahead of the other setting member; retard means for controlling the speed of said one setting member during the entire movement to uncocked position; and delay means for delaying the movement of said other setting member to uncocked position to an extent independent of the retardation of said one setting member by said retard means and following the movement of said one setting member to uncocked position so that the duration of such delay determines not only the size of the diaphragm opening but also the exposure time.

2. In a photographic camera, a combined diaphragm and shutter mechanism comprising a pair of concentric setting rings turnable in the same directions between a single cocked position and a single uncocked position and each tending to assume the respective uncocked position; blade means mounted turnably about pivot axis means parallel to the optical axis of said camera and coupled with said rings and arranged to define a diaphragm opening when one of said rings turns to uncocked position ahead of the other ring; retard means for controlling the speed of said one ring during the entire movement to uncocked position; and delay means for delaying the movement of said other ring to uncocked position to an extent independent of the retardation of said one ring by said retard means and following the movement of said one ring to uncocked position so that the duration of such delay determines not only the size of the diaphragm opening but also the exposure time.

3. In a photographic camera, a combined diaphragm and shutter mechanism comprising a pair of concentric setting rings each turnable in the same direction between a single cocked position an a single uncocked position and each tending to assume the respective uncocked position, one of said rings having a toothed portion; blade means mounted turnably about pivot axis means parallel to the optical axis of said camera and coupled to said rings and arranged to define a diaphragm opening when the other ring turns to uncocked position ahead of said one ring; cocking means for turning the rings to cocked positions; retard means for controlling the speed of said other ring during the entire movement to uncocked position; and delay means for delaying the movement of said one ring to uncocked position to an extent independent of the retardation of said other ring by said retard means and following the movement of said other ring to uncocked position so that the duration of such delay determines not only the size of the diaphragm opening but also the exposure time, said delay means comprising a rockable blocking member having a tooth engageable with and disengageable from said toothed portion, and resilient means for biasing said tooth into engagement with said toothed portion.

4. In a photographic camera, a combined diaphragm and shutter mechanism comprising a pair of concentric setting rings each turnable in the same direction between a single cocked position an a single uncocked position and each tending to assume the respective uncocked position, one of said rings having a toothed portion; blade means mounted turnably about pivot axis means parallel to the optical axis of said camera and coupled to said rings and arranged to define a diaphragm opening when the other ring turns to uncocked position ahead of said one ring; cocking means for turning the rings to cocked position; trigger means for simultaneously releasing said rings for movement to uncocked positions; retard means for controlling the speed of said other ring during the entire movement to uncocked position; and delay means for delaying the movement of said one ring to uncocked position to an extent independent of the retardation of said other ring by said retard means and following the movement of said other ring to uncocked position so that the duration of such delay determines not only the size of the diaphragm opening but also the exposure time, said delay means comprising a rockable blocking member having a tooth engageable with said toothed portion and disengageable from said toothed portion subsequent to simultaneous release of said rings by said trigger means, and resilient means for biasing said tooth into engagement with said toothed portion.

5. In a photographic camera, a combined diaphragm and shutter mechanism comprising a pair of setting members each movable between a single cocked position and a single uncocked position and each tending to assume the respective uncocked position; blade means mounted turnably about pivot axis means parallel to the optical axis of said camera and coupled with said setting members and arranged to define a diaphragm opening when one of said setting members moves to uncocked position ahead of the other setting member; retard means for controlling the speed of said one setting member during the entire movement to uncocked position; and mechanical delay means for delaying the movement of said other setting member to uncocked position to an extent independent of the retardation of said one setting member by said retard means and following the movement of said one setting member to uncocked position so that the duration of such delay determines not only the size of the diaphragm opening but also the exposure time.

6. In a photographic camera, a combined diaphragm and shutter mechanism comprising a pair of setting members each movable between a single cocked position and a single uncocked position and each tending to assume the respective uncocked position; blade means mounted turnably about pivot axis means parallel to the optical axis of said camera and coupled with said setting members and arranged to define a diaphragm opening when one of said setting members moves to uncocked position ahead of the other setting member; retard means for controlling the speed of said one setting member during the entire movement to uncocked position; and pneumatic delay means for delaying the movement of said other setting member to uncocked position to an extent independent of the retardation of said one setting member by said retard means and following the movement of said one setting member to uncocked position so that the duration of delay determines not only the size of the diaphragm opening but also the exposure time.

7. In a photographic camera, a combined diaphragm and shutter mechanism comprising a pair of concentric setting rings each turnable in the same direction between a single uncocked position and each tending to assume the respective uncocked position, one of said rings having a toothed portion; blade means coupled to said rings and arranged to define a diaphragm opening when the other ring turns to uncocked position ahead of said one ring; cocking means for turning the rings to cocked position; retard means for controlling the speed of said other ring during the entire movement to uncocked position; and electrical delay means for delaying the movement of said one ring to uncocked position following the movement of said other ring to uncocked position so that the duration of such delay determines not only the size of the diaphragm opening but also the exposure time, said delay means comprising a rockable blocking member having a tooth engageable with and disengageable from said toothed portion, resilient means for biasing said tooth into engagement with said toothed portion, and relay means energizable to rock said blocking lever against the bias of said resilient means, said blocking lever constituting the armature of said relay means.

8. A structure as set forth in claim 7, wherein said relay means forms part of an electric circuit further including a photosensitive element for determining the de-energization of said relay means in dependency on the intensity of light coming from a viewed scene or subject.

9. A structure as set forth in claim 8, wherein said photosensitive element is a resistor which is connected in parallel with said relay means and wherein said circuit further comprises a source of electrical energy connected in series with said resistor.

10. A structure as set for in claim 9, wherein said circuit further comprises a normally open control switch and a normally closed main switch connected in series with said control switch and with said source, said mechanism further comprising trigger means including a first member arranged to close said main switch in uncocked position of said setting rings and a second member arranged to close said control switch when said rings are fully cocked and to open said control switch when said other ring is free to turn to uncocked position.

11. A structure as set forth in claim 10, wherein the second member of said trigger means comprises a locking portion which engages and locks said other ring in cocked position in automatic response to operation of said cocking means.

12. In a photographic camera, a combined diaphragm and shutter mechanism comprising a pair of concentric setting rings each turnable in the same direction between a single cocked position and a single uncocked position and each tending to assume the respective uncocked position, one of said rings having a toothed portion; a rocking member provided on said other setting ring; blade means mounted turnably about pivot axis means parallel to the optical axis of said camera and coupled to said rings and arranged to define a diaphragm opening when the other ring turns to uncocked position ahead of said one ring; cocking means for turning the rings to cocked position; retard means for controlling the speed of said other ring during the entire movement to uncocked position; and delay means for delaying the movement of said one ring to uncocked position to an extent independent of the retardation of said other ring by said retard means and following the movement of said other ring to uncocked position so that the duration of such delay determines not only the size of the diaphragm opening but also the exposure time, said delay means comprising a rockable blocking member having a tooth engageable with and disengageable from said toothed portion, and resilient means for biasing said tooth into engagement with said toothed portion, said blocking member comprising a portion extending into the path of said rocking member when said tooth engages the toothed portion of said one setting ring so that said tooth is automatically disengaged from such toothed portion on engagement of said portion of the blocking member by said rocking member whereby the one ring is free to return to uncocked position and to close the diaphragm opening.

13. In a photographic camera, a combined diaphragm and shutter mechanism comprising a pair of setting members each movable between a single cocked position and a single uncocked position and each tending to assume the respective uncocked position; blade means mounted turnably about pivot axis means parallel to the optical axis of said camera and coupled with said setting members and arranged to define a diaphragm opening when one of said setting members moves to uncocked position ahead of the other setting member; retard means for controling the speed of said one setting member during the entire movement to uncocked position; delay means for delaying the movement of said other setting member to uncocked position to an extent independent of the retardation of said one setting member by said retard means and following the movement of said one setting member to uncocked position so that the duration of such delay determines not only the size of the diaphragm opening but also the exposure time; and means provided on said one setting member for disengaging said delay means from said other setting member in a predetermined intermediate position of said one setting member during movement to its uncocked position to thereby allow for movement of the other setting member to its uncocked position with resultant closing of the diaphragm opening.

14. A structure as set forth in claim 13, wherein said setting members are rings turnable about the optical axis of the camera and further comprising resilient means for permanently biasing said rings to their respective uncocked positions, said one ring comprising means for turning said other ring during movement to cocked position.

15. In a photographic camera, a combined diaphragm and shutter mechanism comprising a pair of concentric setting rings turnable in the same directions between a single cocked position and a single uncocked position and each tending to assume the respective uncocked position; blade means mounted turnably about pivot axis means parallel to the optical axis of said camera and coupled with said rings and arranged to define a diaphragm opening when one of said rings turns to uncocked position ahead of the other ring; retard means for controlling the speed of said one ring during the entire movement to uncocked position; delay means for stopping said other ring temporarily during the movement to uncocked position and for subsequent liberation to continue said movement so that the duration of the delay between the stopping and the liberation determines not only the size of the diaphragm opening but also the exposure time, the duration of said delay being independent of the retardation of said one ring by said retard means.

References Cited

UNITED STATES PATENTS

| 2,183,802 | 12/1939 | Zizelsberger | 95—63 |
| 2,800,844 | 7/1957 | Durst | 95—54 X |
| 2,890,640 | 6/1959 | Noack | 95—63 |
| 3,116,670 | 1/1964 | Ball | 95—57 X |

JOHN M. HORAN, *Primary Examiner.*